UNITED STATES PATENT OFFICE.

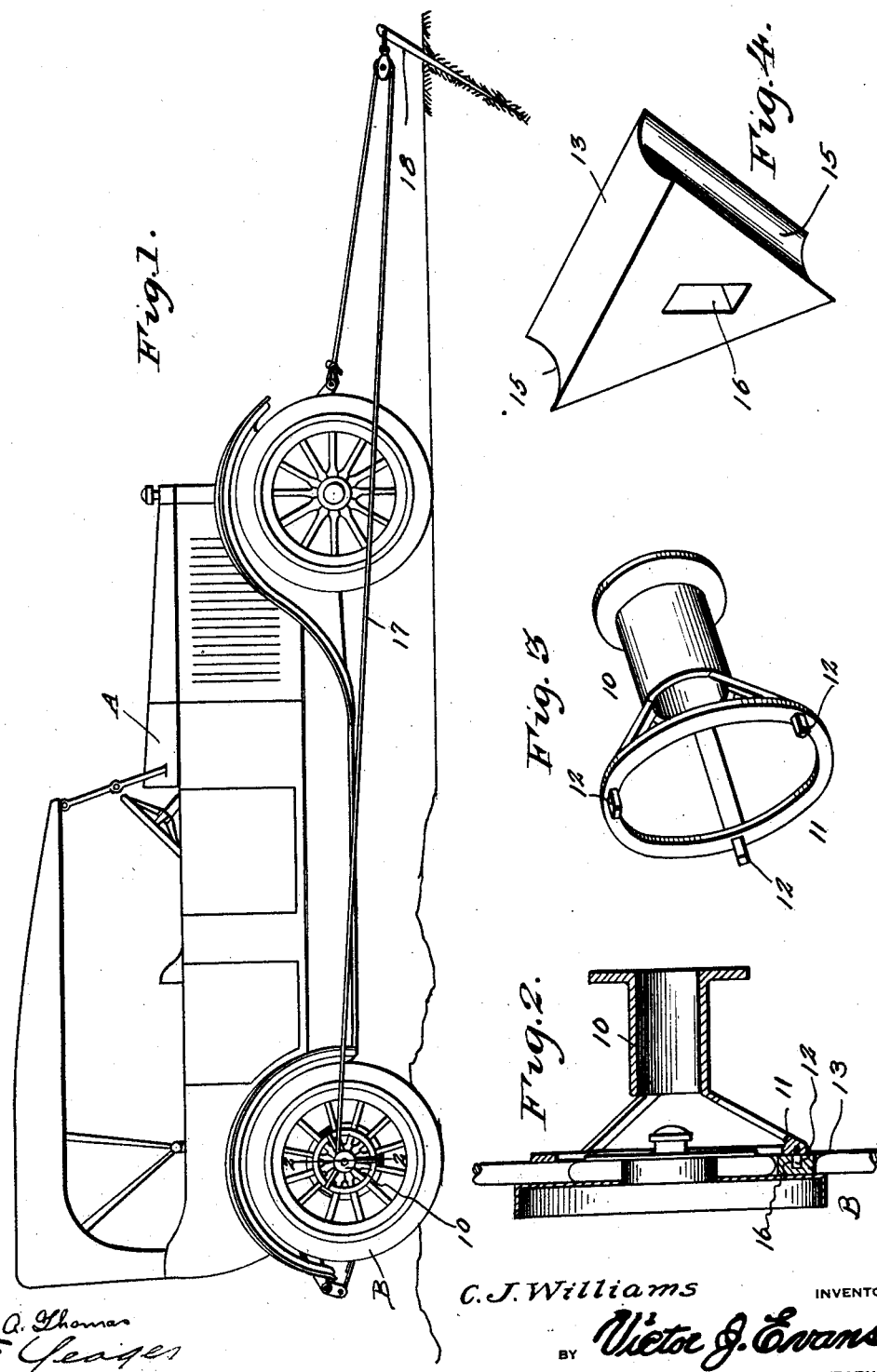

CHARLES J. WILLIAMS, OF POCATELLO, IDAHO.

EXTRACTING DEVICE FOR AUTOMOBILES.

1,408,323.  Specification of Letters Patent.  Patented Feb. 28, 1922.

Application filed May 3, 1921. Serial No. 466,447.

*To all whom it may concern:*

Be it known that I, CHARLES J. WILLIAMS, a citizen of the United States, residing at Pocatello, in the county of Bannock and State of Idaho, have invented new and useful Improvements in Extracting Device for Automobiles, of which the following is a specification.

This invention aims to provide an automobile extracting device, whereby the automobile may be drawn out of mud-holes or the like by its own power.

More specifically stated, the invention embodies a device in the form of a drum designed for association with the hub of one of the track wheels, the drum being associated with one end of a cable, the opposite end of which is secured to a stake or other fixed support, so that the flexible element is wound about the drum to impart movement to the vehicle under conditions above mentioned.

The chief characteristic of the invention resides in providing a device of this character which is very simple in construction, and which can be quickly and easily associated with the wheel of the vehicle, or removed therefrom as the occasion requires.

The nature and advantages of the invention will be better understood when the following detailed description is read in connection with the accompanying drawing, the invention residing in the combination, construction, and arrangement of parts as claimed.

In the drawing forming part of this application, like numerals of reference indicate similar parts in the several views and wherein:

Figure 1 is a side view of a portion of a motor vehicle showing the device associated therewith for use.

Figure 2 is a sectional view taken on line 2—2 of Figure 1.

Figure 3 is a perspective view of the device removed from the wheel.

Figure 4 is a detail view of one of the spoke engaging elements.

Referring to the drawing in detail, A indicates a portion of a motor vehicle of which B represents one of the track wheels. The device forming the subject matter of this invention consists of a drum 10 which is of uniform diameter throughout the major portion of its length, one end of the drum being designed to fit over the hub of the wheel in the manner illustrated in Figures 1 and 2. This end of the drum is enlarged as at 11, and projecting from the enlarged extremity is a plurality of pins 12 for a purpose to be presently described. These pins are used in associating the drum with the wheel, and are used in conjunction with the spoke engaging members illustrated in Figure 4.

There is one of the spoke engaging members used for each pin 12, and the said members are identical in construction. One of these members is indicated at 13 and is designed to accommodate itself in the space between the adjacent spokes of the wheel, while the opposed sides of the member, or in other words, the sides lying adjacent the spokes, are grooved as at 15 to receive the spokes. It is of course understood each member is placed between the spokes adjacent the felly and are then moved down between the spokes in the direction of the hub until they have been positioned in fixed relation to the wheel. Each member is also provided with an opening 16 to accommodate one of the pins 12 of the drum. After the spoke engaging members have been placed in position on the wheel, the pins 12 are positioned in the openings 16, and the drum in this manner is mounted on the wheel for rotation therewith. One end of a flexible element 17 is secured to the drum, the opposite end being fixed to a stake 18 adapted to be driven in the ground at an appropriate distance from the track wheel. It might be stated, however, that the flexible element 16 may have its free elements secured to a tree or any other fixed support to which it may be conveniently attached to. Manifestly, when the wheel is rotated, the cable is wound about the drum, and the motor vehicle is drawn out of a mud-hole or the like under its own power. In case it is impossible to drive either wheel from the motor, in extraordinary bad places in the road, the vehicle may be jacked to space one of the wheels from the ground, and the device can be used upon this wheel in the manner above described.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. In an automobile extricating device, a plurality of spoke engaging members, each member being of triangular formation and having two of its sides grooved, each member also being formed with a square opening, a drum designed to be fitted upon the hub of the wheel, and lugs projecting from one end of the drum and of a size and shape to be snugly received by said openings in the spoke engaging members.

2. An automobile extricating device comprising in combination, a plurality of spoke engaging members, each member being of triangular formation and having two of its sides grooved, each member also having a square opening, a drum designed to be fitted upon the hub of the wheel, arms diverging from one end of the drum, an annulus supported by said arms, and lugs projecting from said annulus and of a size to be snugly received by said openings.

In testimony whereof I affix my signature.

CHARLES J. WILLIAMS.